July 2, 1935.  H. IRMSCHER  2,006,356
NONTANGLING TEA BAG MACHINE
Filed Aug. 31, 1933   8 Sheets-Sheet 2
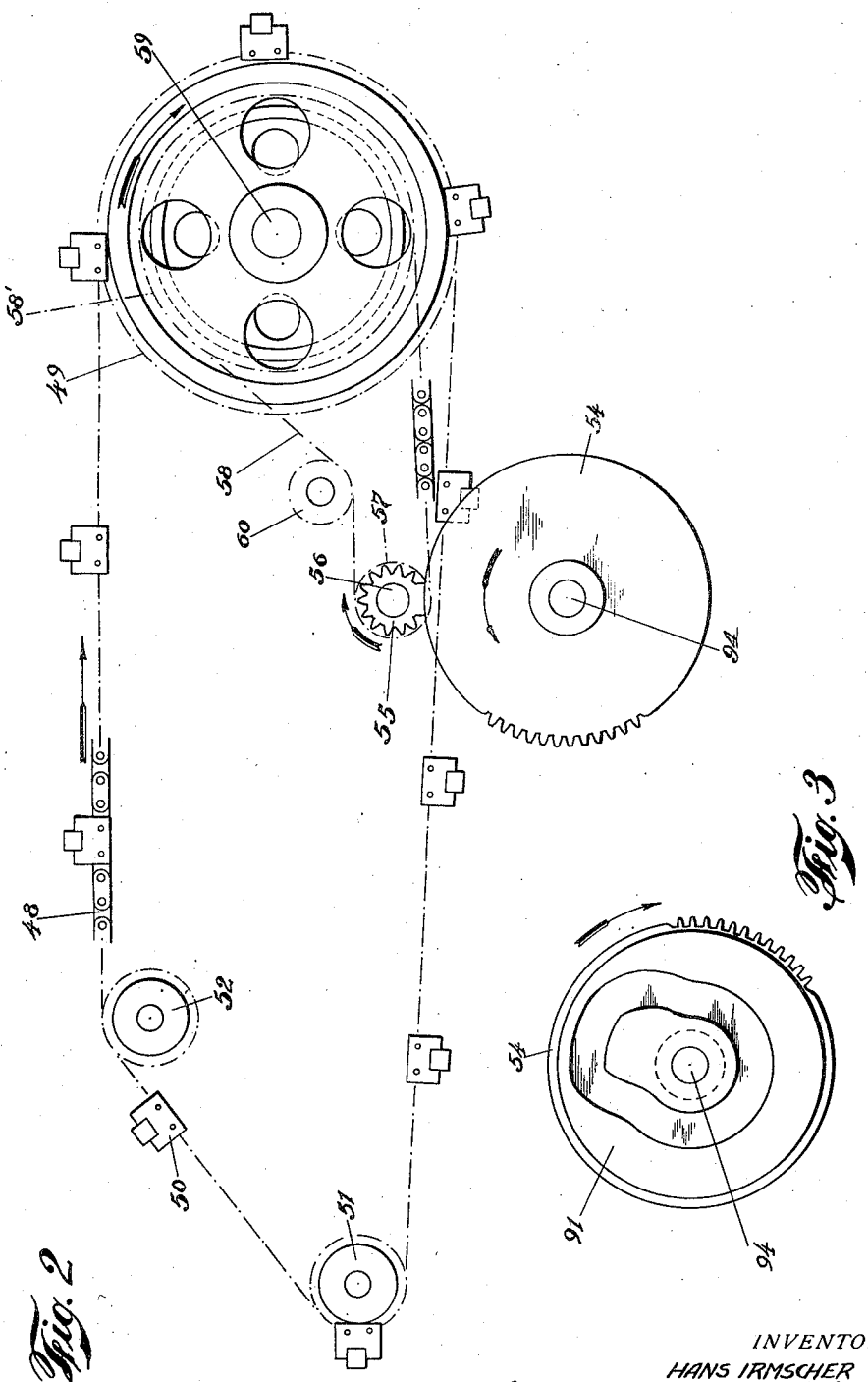

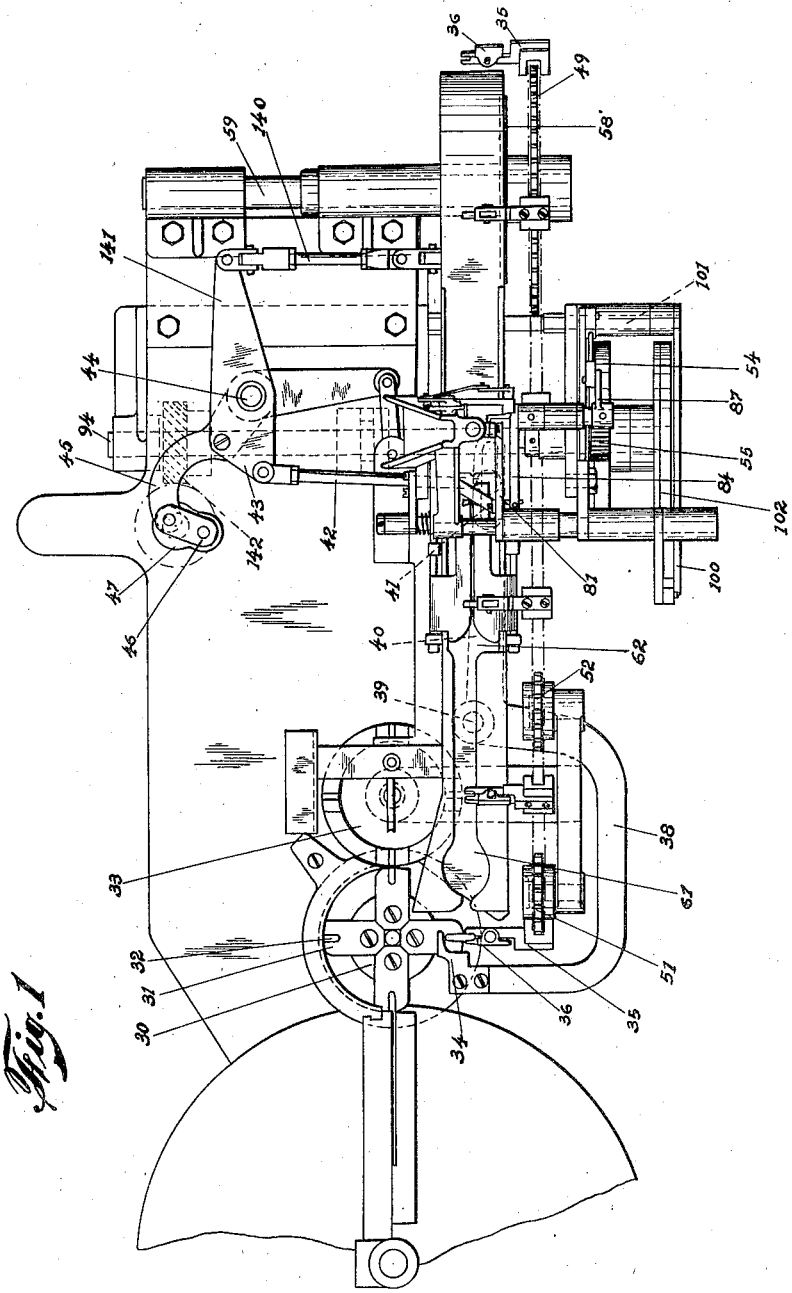

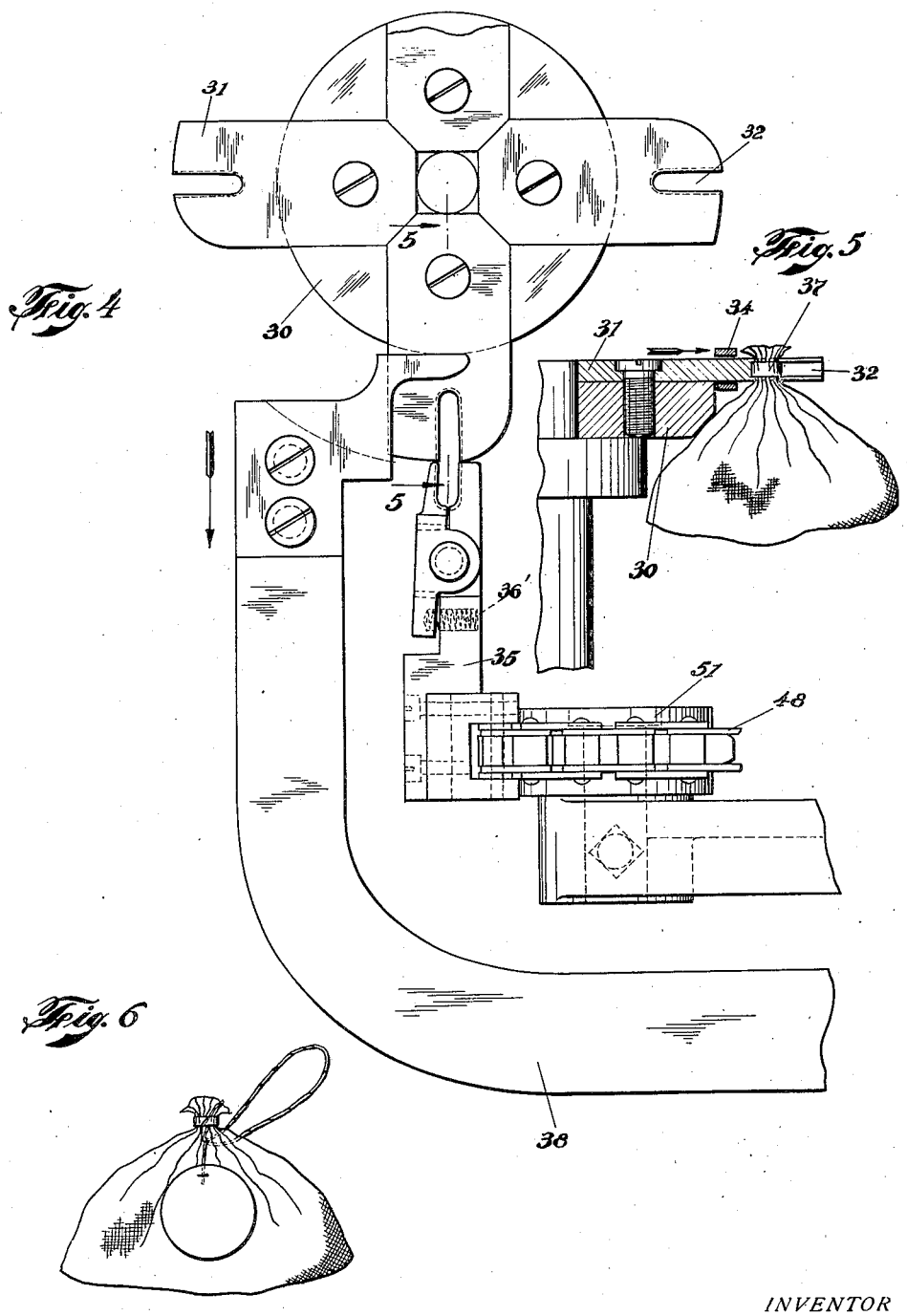

July 2, 1935.  H. IRMSCHER  2,006,356
NONTANGLING TEA BAG MACHINE
Filed Aug. 31, 1933  8 Sheets-Sheet 4
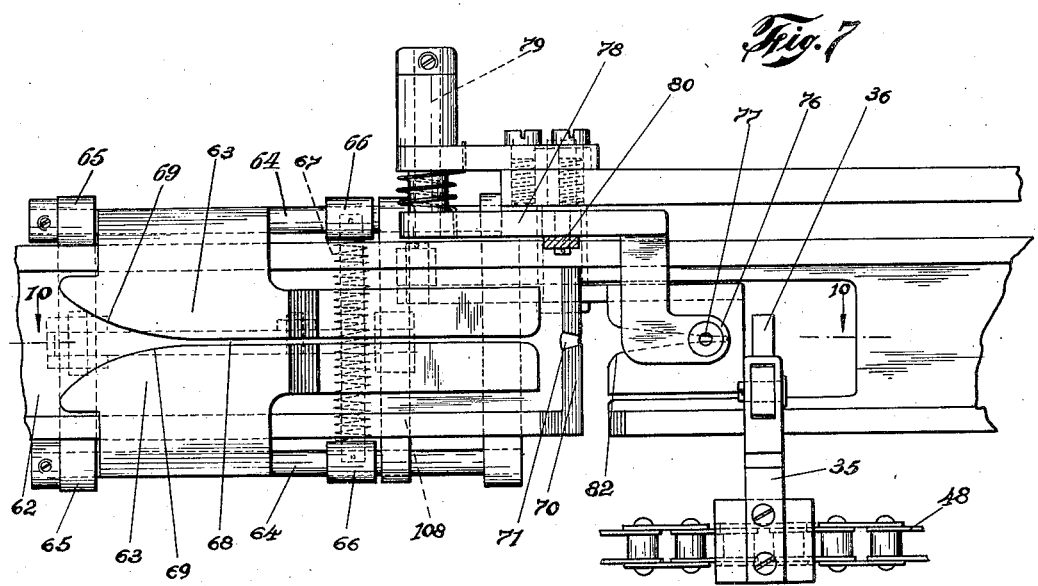
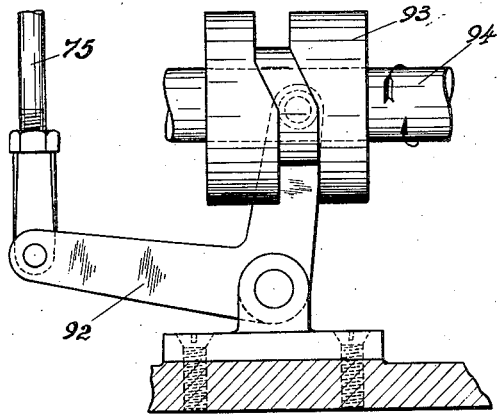
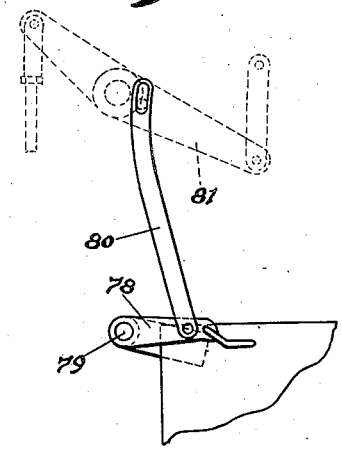
INVENTOR
HANS IRMSCHER
ATTORNEYS

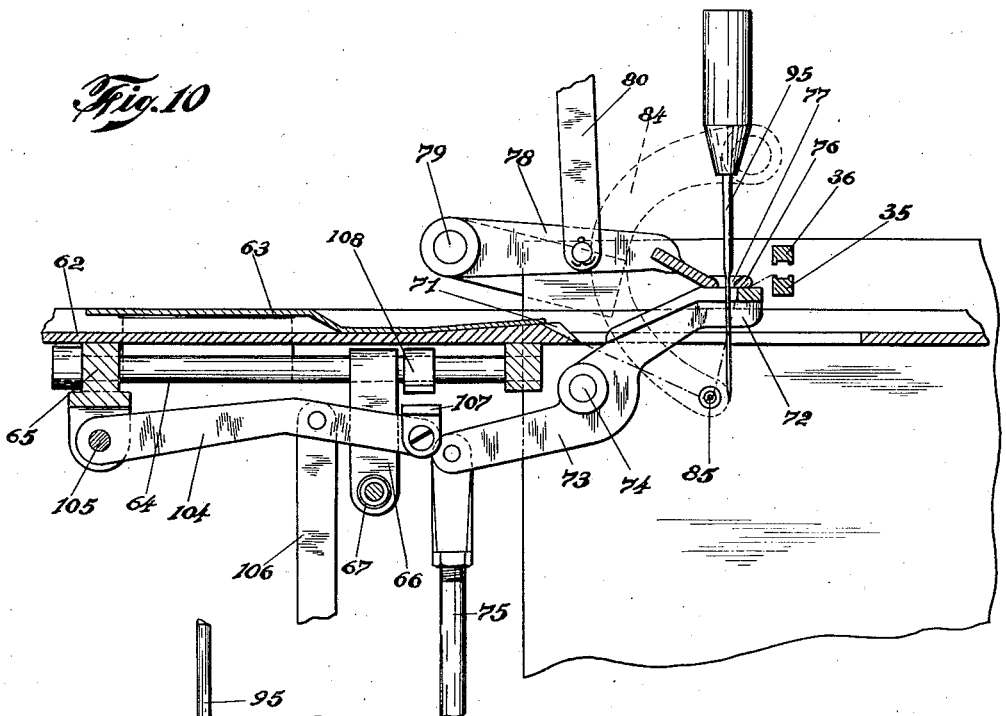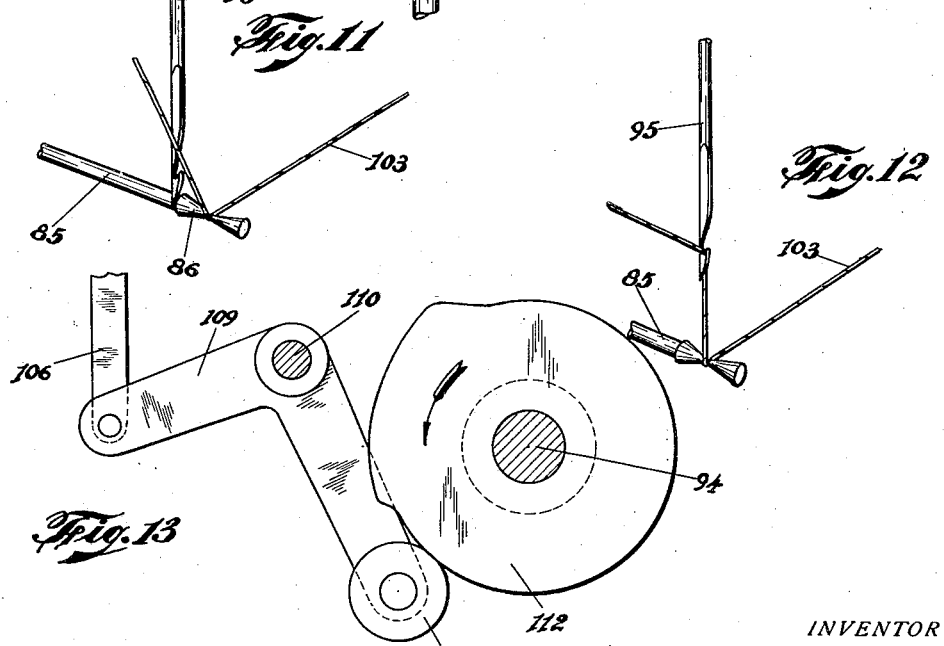

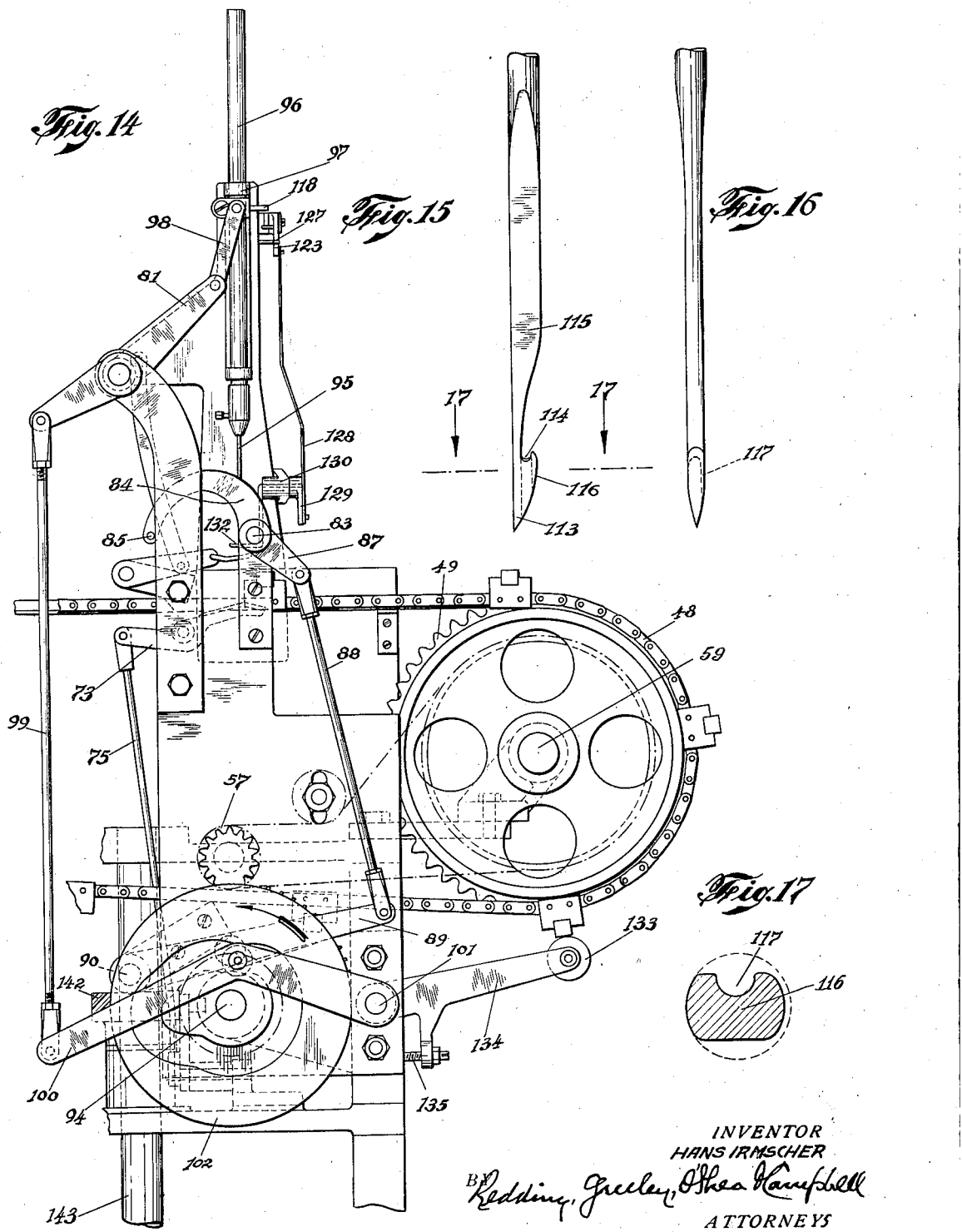

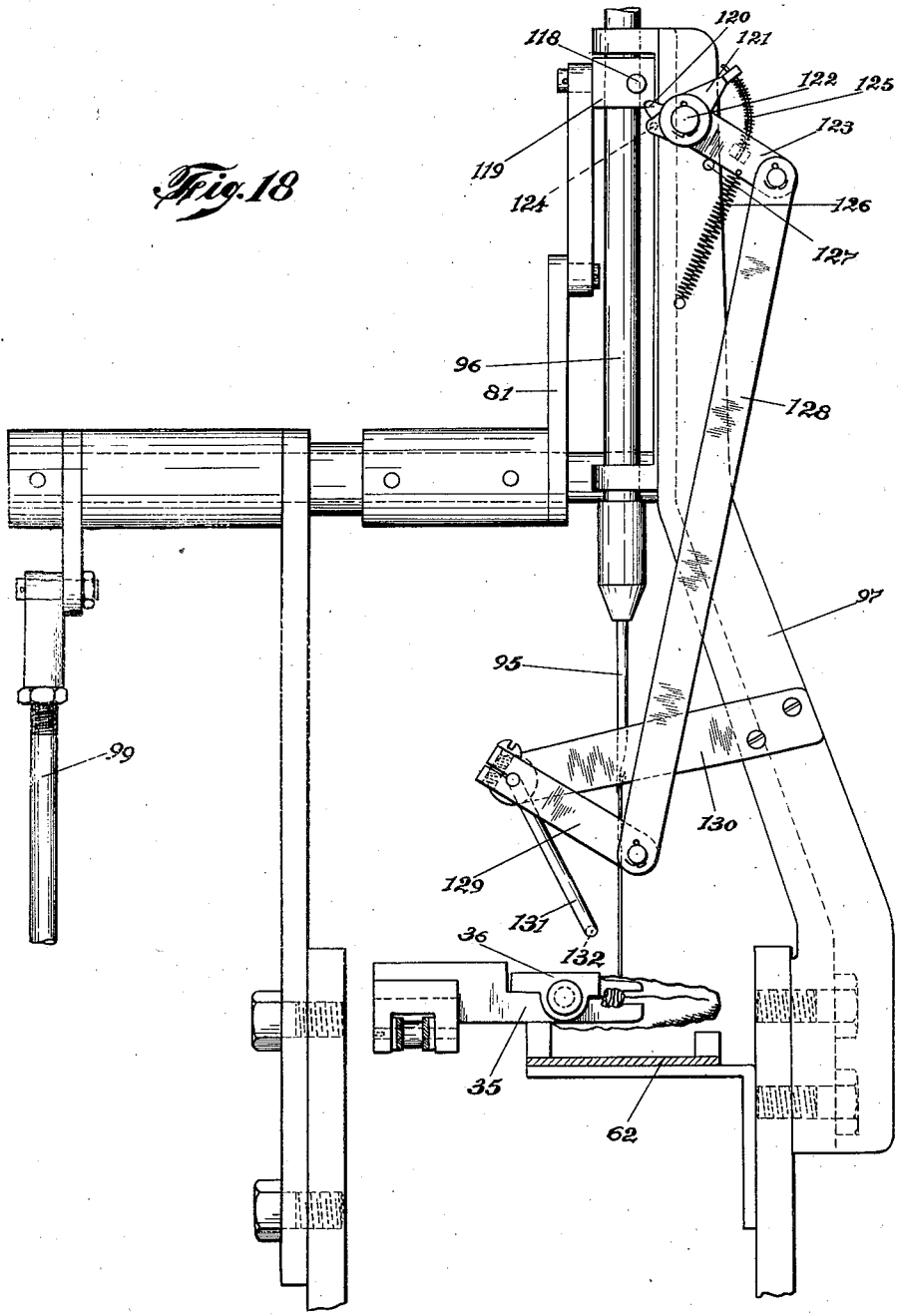

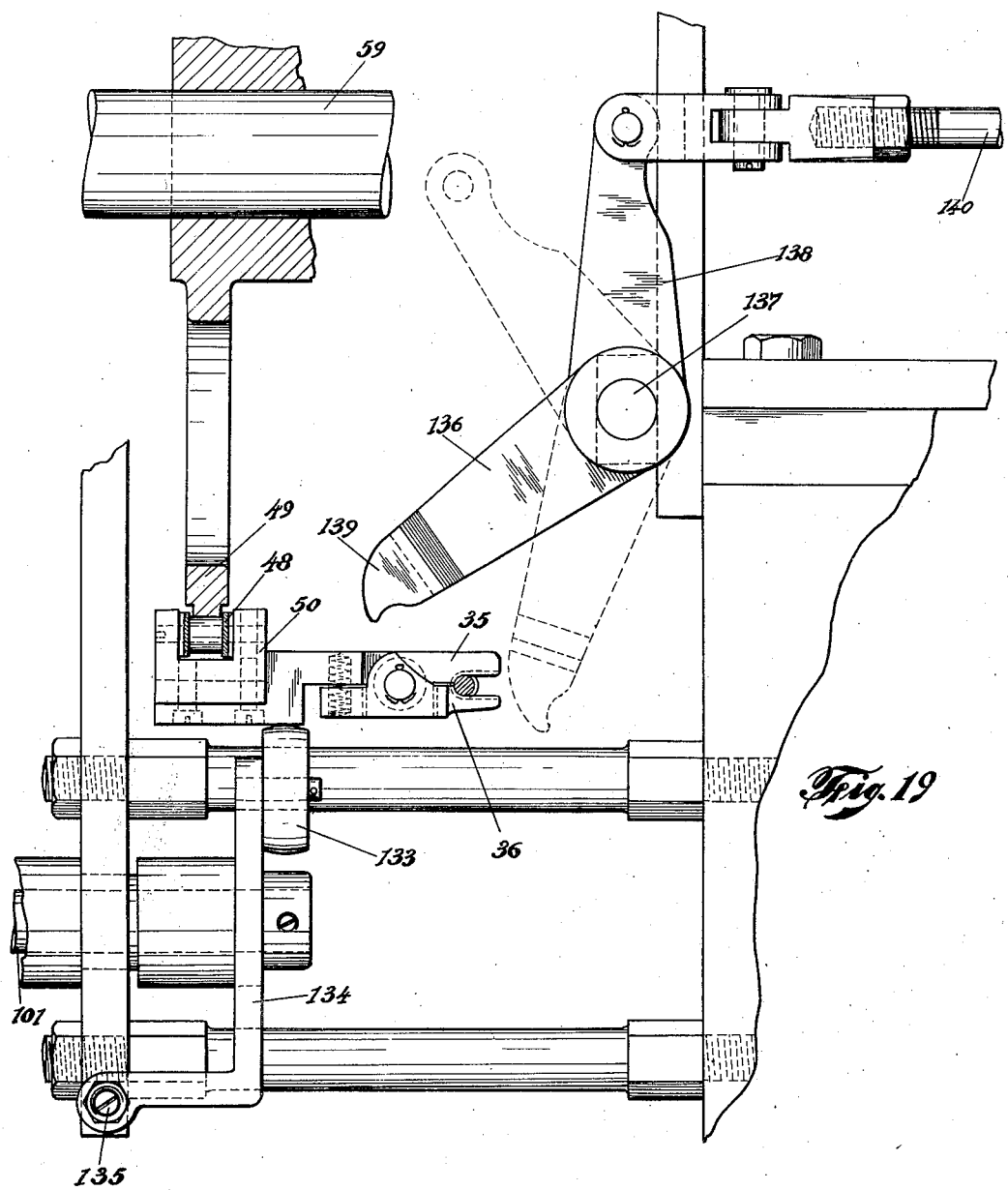

Patented July 2, 1935

2,006,356

UNITED STATES PATENT OFFICE 2,006,356

NONTANGLING TEA BAG MACHINE

Hans Irmscher, New York, N. Y., assignor to Millie Patent Holding Co. Inc., New York, N. Y., a corporation of New York Application August 31, 1933, Serial No. 687,579

25 Claims. (Cl. 226—56)

The present invention relates to machines for shortening the effective lengths of strings which have tags secured to one of the ends thereof, the other ends being secured to bags or other receptacles. More particularly, the invention comprises an improved form of machine for shortening the effective lengths of strings which have been secured to bags, in order that the tendency of such strings to become tangled, when a number of the bags are packed in a common package, may be reduced to a minimum.

It is commonly known that tea bags and other similar receptacles having strings and tags attached thereto, when packed in numbers in a common receptacle, are sometimes difficult to extract from such receptacle because the strings and tags of the bags become entangled. To avoid this difficulty, it has been proposed to shorten the effective length of the string upon which a tag is secured. In order that this operation may be accomplished more effectively, the present invention has been designed, and an object thereof is to provide a device for shortening the effective lengths of tag bearing strings which have been secured to bag-like receptacles.

A further object of the invention is to provide a device of the above character by means of which loops are formed in the string by inserting the string through the material of the bag and drawing the tag upon the end thereof into proximity to the bag.

A further object of the invention is to provide a device by means of which bags are closed and strings attached thereto, means being provided to supply the closed bags to a carrier upon which the effective lengths of strings are shortened.

A further object of the invention is to provide a non-tangling or shortening device wherein means is provided for holding tags frictionally and holding receptacles securely while performing a looping operation upon the strings secured to the receptacles by inserting the same through the material of the receptacles.

A further object of the invention is to provide an improved form of looping mechanism by means of which loops may be formed effectively, the string and associated elements being accurately guided and positioned during the looping operations.

Further objects of the invention will be apparent as it is described in detail in connection with the accompanying drawings, wherein—

Figure 1 is a plan view of a machine constructed in accordance with the present invention and adapted to shorten the effective lengths of strings secured to receptacles by looping the same through the material of the receptacles.

Figure 2 is a schematic view in side elevation, showing the receptacle carrying means of Figure 1.

Figure 3 is a view in side elevation, showing the cam and driving means for the string guiding mechanism.

Figure 4 is an enlarged detail view of the means for removing the bags from the closing mechanism and applying them to the carrier of the present invention.

Figure 5 is a view in section, taken on the plane indicated by the arrow 5 of Figure 4, and looking in the direction of the arrow.

Figure 6 is a plan view of a receptacle after the looping operation has been performed thereon.

Figure 7 is an enlarged partial plan view showing the frictional tag guiding mechanism and string guiding mechanism of the looping device.

Figure 8 is a partial view of the driving mechanism by means of which the frictional tag guiding means is actuated.

Figure 9 is a partial view in side elevation, showing the means for actuating the presser foot which engages the bag and is shown in Figure 7.

Figure 10 is a view in section, taken on the plane indicated by the arrow 10 of Figure 7, and looking in the direction of the arrow.

Figure 11 is a partial view in isometric projection, showing the action of the looping needle and the string guiding means.

Figure 12 is a view similar to Figure 11, showing the engagement of the needle with the string.

Figure 13 is a partial view in sectional elevation, showing the mechanism by means of which the frictional tension on the tags is relieved.

Figure 14 is an enlarged partial view in elevation of the looping mechanism shown in Figures 1 and 10.

Figure 15 is an enlarged detail view in side elevation of the looping needle.

Figure 16 is a view in elevation, as seen from the right hand in Figure 15, of the needle.

Figure 17 is a view in section, taken on the line 17—17 of Figure 15, on a larger scale, and looking in the direction of the arrows.

Figure 18 is a view in end elevation, partly broken away and in section, showing the looping mechanism of Figure 14.

Figure 19 is a view in end elevation, partly broken away and in section, showing the means for removing the bags from the carrier.

Referring to the above drawings, and particularly to Figure 1, the reference character 30 indicates a rotating turret having arms 31 formed with notches 32 within which the necks of the bags are received. A turret 33 is provided with means by which collars are secured around the necks of the bags in notches 32. The foregoing mechanism follows what is now common practice in many respects, and, inasmuch as this structure is old, further description thereof is unnecessary herein. When each arm reaches the position of the lower-most arm 31 in Figure 1, a forked arm 34 (Figures 1, 4 and 5) engages the neck of the bag carried by such arm 31 and moves the same to a juxtaposed arm 35 upon which a pivoted gripping finger 36 is secured. The forked arm 34 forces the collar 27, which has been secured to the bag, between the arm 35 and the pivoted finger 36 and causes the bag to be securely grasped therebetween. A spring 36' may be provided to urge the gripping end of finger 36 toward the arm 35.

Arm 34 is formed as an extension of curved arm 38 which is pivoted at 39 and formed with an arm 40 which is provided with a slotted extension 41, actuated by a link 42 which is pivoted to a crank member 43. Crank member 43 is pivoted at 44 and is actuated by an arm 45, connected by a link 46 to an eccentric driving arm 47.

The arms 35 are secured to an endless chain 48 (Figures 1, 2 and 4) which is driven by a sprocket wheel 49. Brackets 50 serve as a means for securing the arms 35 to the chain without interfering with the driving of the latter by the sprocket wheel 49 and idler sprockets 51 and 52 serve as a guiding means to direct the chain and arms 35 in the proper path.

A drive shaft 94 is provided with a driving gear 54 which engages a driven gear 55, secured to a counter shaft 56. The gears 54 and 55 are outside of the plane of the chain 48, as clearly shown in Figure 1, and countershaft 56 extends through the plane of the chain 48 and between the spans thereof. Adjacent the other end of the shaft 56, and upon the opposite side of the plane of the chain 48 from the gear 54, is secured a driving sprocket 57 (Figure 14). A chain 58 engages the driving sprocket 57 and a driven sprocket 58' (Figures 1 and 2), sprocket 58' being secured to a shaft 59, upon which the driving sprocket 49 is secured. In this fashion, chain 48 is driven by the power shaft 94, an idler sprocket 60 being provided to apply a suitable tension and guiding force to the chain 58.

As the bag is carried by the chain in the direction indicated by the arrow in Figure 2, the string and tag which are secured thereto move into a channeled guide 61 (Figure 1). This guide directs the tag over a table 62, above and to each side of which are presser plates 63 (Figure 7). These plates are secured to shafts 64 which are journaled in brackets 65 and provided with arms 66, between which a spring 67 is secured to urge the presser plates 63 downwardly against the table 62. The adjacent edges of the plates 63 are spaced to form a slot 68, the ends of the plates being tapered at 69 to form a tapering entrance to the slot 68. As the tag is dragged over the table 62 upon movement of the bag by the arms 35, and a guide arm moves downwardly as described hereinafter, the string passes along the slot 68 and engages the centering recess 71 (Figure 7. Recess 71 is formed in the chamfered extremity 70 of table 62.

The bag carried by an arm 35 is moved over a lower presser foot 72 which is mounted upon a lever 73, pivoted at 74 and actuated by a link 75 (Figure 10), operated by a crank arm 92 which is actuated by a cam 93, mounted upon a power shaft 94.

The upper presser foot 76 is formed with an aperture 77 and mounted upon a lever 78 which is journaled upon shaft 79, being actuated by a link 80 and bell crank lever 81, as shown in Figure 9 and 14. The lower presser foot 72 is formed with a recessed notch 82, through the apex of which a looping needle is adapted to pass, as will be described hereinafter.

Journaled above the presser feet upon a shaft 83 (Figure 14) is an arm 84 upon the end of which a longitudinal extension 85 is secured. The end of the extension is formed with oppositely extending conical surfaces 86, the common apex of which forms a string guide, as shown in Figures 11 and 12. This common apex always moves in the same vertical plane and thus insures the accurate positioning of the string in order that it may be engaged by the looping needle described hereinafter. The lever 84 is formed with an arm 87 which is actuated by a link 88, connected to a lever 89 which is pivoted at 90 and actuated by a cam 91 upon power shaft 94.

While the bag is engaged by the presser feet 72 and 76, a needle 95 is driven through the bag. This needle is mounted upon a needle bar 96 which is guided in a stationary standard 97 and connected by a link 98 to the lever 81. The other end of lever 81 is connected to a link 99, which is pivoted to one end of a lever 100 journaled at 101. A cam 102, mounted upon power shaft 94, actuates the lever 100 and thus causes reciprocation of the needle bar 96 and upper presser foot 76. Prior to the descent of the needle 95, the lever 84 is rocked downwardly into the dotted position shown in Figure 10. This movement takes place after the bag has been engaged between the presser feet and while the tag is held frictionally by the presser plates 63. The string which connects the bag to the tag, shown at 103 in Figures 11 and 12, is engaged by the conical guide surfaces 86 and is thus positioned in the proper vertical plane to be engaged by the needle 95 after it has passed through the receptacle. The dotted lines indicate such positioning in Figure 10, Figures 11 and 12 illustrating the motion of the needle during the engaging and return movement. The tension placed upon the tag by the presser plates 63 insures the positioning of the string properly over the guide while being engaged by the needle. After the string has been engaged by the needle, as shown in Figure 12, and the needle leaves the bag on its upward stroke, further tension upon the tag is released by a lever 104 (Figure 10) which is pivoted at 105 and actuated by a link 106. The end of the lever is provided with a presser foot 107, which is adapted to engage arms 108, secured to the shafts 64. The shafts are thus rocked in such fashion as to elevate the presser plates 63. Link 106 is pivoted to a bell-crank lever 109, which is journaled at 110 and provided with a roller 111 which is engaged by cam 112, mounted upon power shaft 94.

In order that the string 103 may be freed from the folds of the bag adjacent the neck to assume the position shown in dotted lines in Figure 10, the lower presser foot 72 is preferably not moved into engagement with the bag until the arm 84 has engaged the string 103 during its downward motion.

As shown in Figures 15, 16 and 17, the needle is formed with a point 113 and a hook 114. The shank 115 of the needle is larger than the head 116, a groove 117 being formed in the side of the head to serve as a guide for the string before the needle moves the string into the bag. In the downward movement of the needle into the bag, the point 113 pierces the bag and the needle descends until the shank 115 engages the bag. During this downward movement the curved surface of the head 116 engages the span of the string between the lower presser foot 72 and the guide 86. Further downward movement of the needle causes the head 116 to pass the string and the latter snaps back into a position above the hook 114. Upon upward movement of the needle the hook engages the string, as shown in Figure 12, and the presser plates 63 are raised in order that the tag may follow freely the movement of the string through the needle hook. Continued upward movement of the needle, as shown in Figure 18, draws the string in loop formation above the bag until the needle reaches the upper limit of its motion. During the latter part of such upward motion, a pin 118, formed on a collar 119, secured to the needle bar 96, engages a detent 120 which is formed upon an arm 121, journaled at 122. A second arm 123 is journaled at 122 and is provided with a stop pin 124, which is adapted to be engaged by the lower surface of detent 120 to limit downward movement of the detent with respect to the pin 124. A spring and guide 125 are connected between the arms 121 and 123 to urge the same normally apart and cause the detent 120 to engage the stop pin 124. Spring 126 normally maintains the arm 123 in the position shown in Figure 18 and against a stop pin 127. A link 128 is pivoted upon arm 123 and an arm 129, which is journaled upon a bracket 130, secured to the standard 97, arm 129 having an arm 131 formed thereon, which is provided with a hook-shaped extremity 132. The movement of the hook-shaped extremity 132 is across the path of the needle 95 and the extremity thus serves as a means for kicking the string from the needle hook.

As before stated, the latter part of the upward motion of the needle bar 96 causes the pin 118 to engage the detent 120. The arm 121 thus swings in a clockwise direction, as viewed in Figure 18, and moves with respect to the arm 123. When the pin 118 disengages the detent 120, the arm 121 snaps back into the position shown in Figure 18 and the operating mechanism for the needle bar is so designed as to impart sufficient downward motion thereto to cause the pin 118 to reengage the detent 120, and thus move the arm 123 and link 128 upwardly, as viewed in Figure 18. This motion swings the hook-shaped extremity 132 into engagement with the loop of string over the needle hook and, as the needle hook is lowered, the loop is kicked away therefrom in order that the bag may be positively freed from the looping mechanism.

The carrier and arms 35 then move about the sprocket wheel 49 and the arms 35 engage a roller 133, journaled upon a bracket 134, which is pivoted to the frame of the machine. A set screw 135 may be provided to vary the position of the roller 133 with respect to the arms 35 upon the chain 48. When the arms 35 reach the roller 133, the bags are released therefrom by means of the mechanism shown in Figure 19. This mechanism includes an arm 136 which is journaled at 137 and to which is connected an operating arm 138. The end of arm 136 is provided with a forked extension 139 which moves over the ends of arms 35 and into the dotted position shown in Figure 19. Such movement causes the forked extension to engage the bag which is frictionally held between the finger 36 and arm 35, and disengage the same therefrom. Such operation is afforded by means of a link 140 which is shackled to the end of arm 138 and shackled, at the other extremity, to an arm 141 upon the lever plate 143.

Obviously, the driving mechanism may take any suitable form and, in the present construction, the power shaft 94 is driven through a worm and worm wheel connection 142 (Figures 1 and 14) by a power shaft 143 upon which the driving crank 47 is secured.

It will thus be seen that a machine has been provided by means of which bags having strings and tags secured thereto are carried to a device for rendering the strings and tags non-tangling, such device placing loops in the strings and through the bags to hold the tags frictionally adjacent the bags. The mechanism for performing this operation is positive in nature, insuring accurate and positive positioning of the string during the needle engaging operation, and having means to transport and position the bag properly during all such operations.

While the invention has been described with specific reference to the construction shown in the accompanying drawings, it is not to be limited save as defined by the appended claims.

I claim as my invention:

1. A device for shortening the effective length of a tag bearing string attached to a bag comprising a carrier having bag receiving means thereon, a tag guiding means associated with the carrier, and means to draw the string of a bag through the bag to which the string is attached.

2. A device for shortening the effective length of a tag bearing string attached to a bag comprising a carrier having bag receiving means thereon, a tag guiding means associated with the carrier, and means to draw the string of a bag through the bag to which the string is attached, said means forming a loop in the string and maintaining the tag adjacent the bag.

3. A device for shortening the effective length of a tag bearing string attached to a bag comprising a carrier having bag receiving means thereon, a tag guiding means associated with the carrier, a needle, means for actuating the needle to drive the same through a bag held by the carrier, and means to position the string to be engaged by the needle.

4. A device for shortening the effective length of a tag bearing string attached to a bag comprising a carrier having bag receiving means thereon, a tag guiding means associated with the carrier, a needle, means for actuating the needle to drive the same through a bag held by the carrier, means to hold the bag frictionally, and means to position the string to be engaged by the needle.

5. A device for shortening the effective length of a tag bearing string attached to a bag comprising a carrier having bag receiving means thereon, a tag guiding means associated with the carrier, a needle, means for actuating the needle to drive the same through a bag held by the carrier, means to hold the bag frictionally, means to position the string to be engaged by the needle, and means to relieve the frictional 6. A device for shortening the effective length of a tag bearing string attached to a bag comprising a carrier having bag receiving means thereon, a tag guiding means associated with the carrier, a needle, means for actuating the needle to drive the same through a bag held by the carrier, and means to space the length of string, adjacent the securing point thereof to the bag, from the bag.

7. A device for shortening the effective length of a tag bearing string attached to a bag comprising a carrier having bag receiving means thereon, a tag guiding means associated with the carrier, a needle, means for actuating the needle to drive the same through a bag held by the carrier, a presser foot upon which the bag is adapted to rest, means to tension the string away from the bag, and means to move the presser foot into engagement with the bag to support the bag thereon.

8. A device for shortening the effective length of a tag bearing string attached to a bag comprising a carrier having bag receiving means thereon, a tag guiding means associated with the carrier, a needle, means for actuating the needle to drive the same through a bag held by the carrier, upper and lower presser feet to engage and hold the bag in a desired position, and means to tension the string away from the bag.

9. A device for shortening the effective length of a tag bearing string attached to a bag comprising a carrier having bag receiving means thereon, a tag guiding means associated with the carrier, a needle, means for actuating the needle to drive the same through a bag held by the carrier, a string guiding means to position the string to be engaged by the needle, and means to move the string guiding means into engagement with the string.

10. A device for shortening the effective length of a tag bearing string attached to a bag comprising a carrier having bag receiving means thereon, a tag guiding means associated with the carrier, a needle, means for actuating the needle to drive the same through a bag held by the carrier, a string guiding means to position the string to be engaged by the needle, means to move the string guiding means into engagement with the string, and means to apply a yielding frictional force to the tag on the string.

11. A device for shortening the effective length of a tag bearing string attached to a bag comprising a carrier having bag receiving means thereon, a tag guiding means associated with the carrier, a needle, means for actuating the needle to drive the same through a bag held by the carrier, a string guiding means to position the string to be engaged by the needle, and spaced presser plates cooperating with the tag guiding means to apply a frictional force to the tag.

12. A device for shortening the effective length of a tag bearing string attached to a bag comprising a carrier having bag receiving means thereon, a tag guiding means associated with the carrier, a needle, means for actuating the needle to drive the same through a bag held by the carrier, a string guiding means to position the string to be engaged by the needle, and spaced presser plates hinged to the sides of the tag guiding means, the adjacent edges of the plates forming a guide slot for the string.

13. A device for shortening the effective length of a tag bearing string attached to a bag comprising a carrier having bag receiving means thereon, a tag guiding means associated with the carrier, a needle, means for actuating the needle to drive the same through a bag held by the carrier, a string guiding means to position the string to be engaged by the needle, spaced presser plates hinged to the sides of the tag guiding means, the adjacent edges of the plates forming a guide slot for the string, means to urge the plates against the guide, and means to move the plates away from the guide when the needle has left the bag.

14. A device for shortening the effective length of a tag bearing string attached to a bag comprising a carrier having bag receiving means thereon, a tag guiding means associated with the carrier, a needle, means for actuating the needle to drive the same through a bag held by the carrier, a lower presser foot upon which a bag is adapted to rest and having a string and needle receiving notch formed therein, an upper presser foot having a needle receiving aperture, and means to move the presser feet into engagement with a bag.

15. A device for shortening the effective length of a tag bearing string attached to a bag comprising a carrier having bag receiving means thereon, a tag guiding means associated with the carrier, a needle, means for actuating the needle to drive the same through a bag held by the carrier, and means to position the string to be engaged by the needle, said needle having a shank larger than its head.

16. A device for shortening the effective length of a tag bearing string attached to a bag comprising a carrier having bag receiving means thereon, a tag guiding means associated with the carrier, a needle, means for actuating the needle to drive the same through a bag held by the carrier, and means to position the string to be engaged by the needle, said needle having a head curved from its point to a hook formed therein and a shank larger than the head.

17. A device for shortening the effective length of a tag bearing string attached to a bag comprising a carrier having bag receiving means thereon, a tag guiding means associated with the carrier, a needle, means for actuating the needle to drive the same through a bag held by the carrier, and means to position the string to be engaged by the needle, said needle having a head curved from its point to a hook formed therein and a shank larger than the head, the string positioning means holding the string in the path of the curved portion of the head of the needle.

18. A device for shortening the effective length of a tag bearing string attached to a bag comprising a carrier having bag receiving means thereon, a tag guiding means associated with the carrier, a needle, means for actuating the needle to drive the same through a bag held by the carrier to engage the string attached to the bag and withdrawing the needle from the bag to form a loop in the string, and means to disengage the string from the needle after the needle has left the bag.

19. A device for shortening the effective length of a tag bearing string attached to a bag comprising a carrier having bag receiving means thereon, a tag guiding means associated with the carrier, a needle, means for reciprocating the needle to drive the same through a bag held by the carrier, said needle engaging the string of a bag adjacent the lower limit of its motion, and means to disengage the string from the needle adjacent the upper limit of its motion.

20. A device for shortening the effective length of a tag bearing string attached to a bag comprising a carrier having bag receiving means thereon, a tag guiding means associated with the carrier, a needle, means for reciprocating the needle to drive the same through a bag held by the carrier, said needle engaging the string of a bag adjacent the lower limit of its motion, and means actuated by the needle reciprocating means to disengage the string from the needle adjacent the upper limit of its motion.

21. A device for shortening the effective length of a tag bearing string attached to a bag comprising a carrier having bag receiving means thereon, a tag guiding means associated with the carrier, a needle, means for reciprocating the needle to drive the same through a bag held by the carrier, said needle engaging the string of a bag adjacent the lower limit of its motion, a detent, means on the needle reciprocating means to actuate the detent, and means actuated by the detent to disengage the string from the needle.

22. A device for shortening the effective length of a tag bearing string attached to a bag comprising a carrier having bag receiving means thereon, a tag guiding means associated with the carrier, a needle, means for reciprocating the needle to drive the same through a bag held by the carrier, said needle engaging the string of a bag adjacent the lower limit of its motion, a detent, means on the needle reciprocating means to actuate the detent, an arm journaled on the detent, means to permit relative movement between the arm and detent when the detent is engaged by upward movement of the needle reciprocating means, means to prevent relative movement between the arm and detent when the detent is engaged by the needle reciprocating means in its downward movement, and means actuated by the arm to disengage the string from the needle.

23. A device for shortening the effective length of a tag bearing string attached to a bag comprising a needle, and means for actuating said needle to draw said string through the bag for bringing the tag adjacent one side of the bag with the string extending as a free loop from the other side thereof.

24. A device for shortening the effective length of a tag bearing string attached to a bag comprising a tag guiding means, and means for drawing a loop of said string through the bag to extend from the other side thereof.

25. In combination with means for supporting a bag, a device for shortening the effective length of a tag bearing string attached to the bag comprising means for drawing said string through the bag, said means operative to form a readily releasable loop in the string for maintaining the tag adjacent the bag.

HANS IRMSCHER.